United States Patent [19]
Michael

[11] 3,762,138
[45] Oct. 2, 1973

[54] MOWER BLADE
[76] Inventor: Russell H. Michael, 1809 Winans Ave., Halethorpe, Md. 21227
[22] Filed: June 15, 1972
[21] Appl. No.: 263,257

[52] U.S. Cl. ................................................. 56/295
[51] Int. Cl. ............................................ A01d 55/18
[58] Field of Search ...................................... 56/295

[56] References Cited
UNITED STATES PATENTS
| | | | |
|---|---|---|---|
| 3,321,894 | 5/1967 | Ingram | 56/295 |
| 2,764,865 | 10/1956 | Pollard | 56/295 |
| 3,399,519 | 9/1968 | Buchanan | 56/295 |
| 3,184,907 | 5/1965 | Harloff | 56/295 |
| 2,924,059 | 2/1960 | Beeston, Jr. | 56/295 |

Primary Examiner—Louis G. Mancene
Assistant Examiner—J. N. Eskovitz
Attorney—J. Wesley Everett

[57] ABSTRACT

A mower blade assembly including a blade bar and cutter elements removably attached to the blade bar for mounting on a perpendicular power driven shaft wherein the cutter elements are positioned adjacent the ends and leading edge of the blade bar including means for releasably securing the cutter elements to the blade bar.

4 Claims, 4 Drawing Figures

PATENTED OCT 2 1973 3,762,138
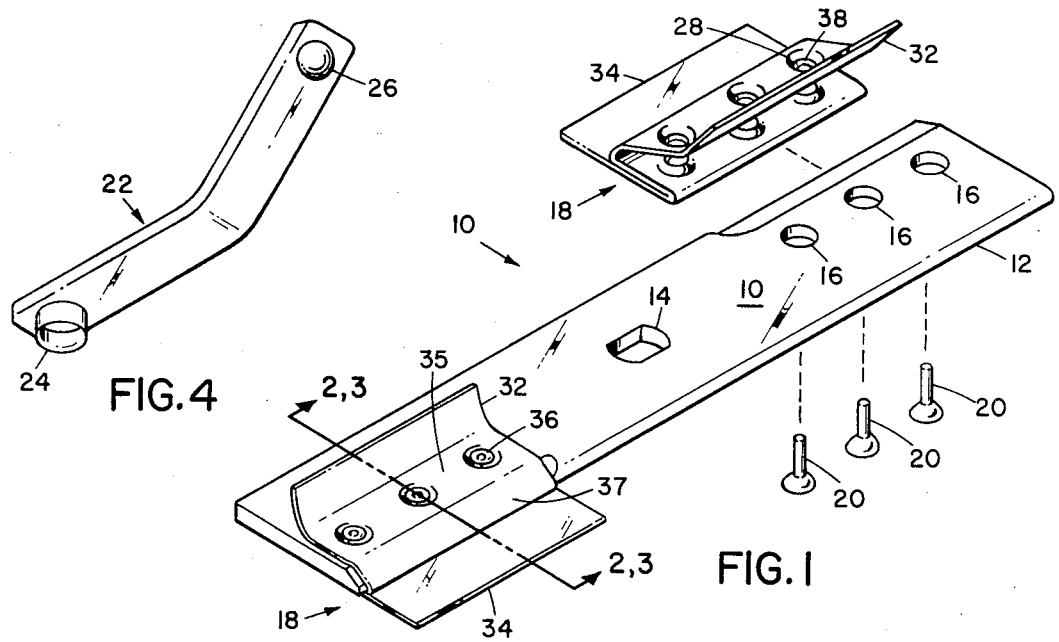
FIG. 4
FIG. 1
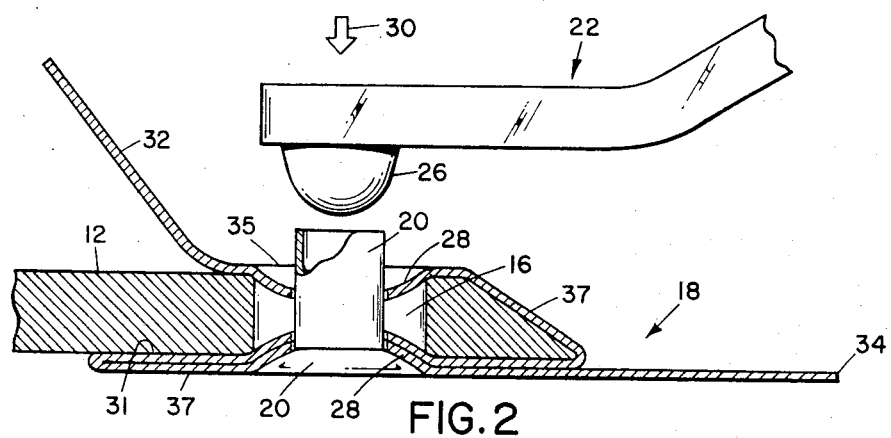
FIG. 2
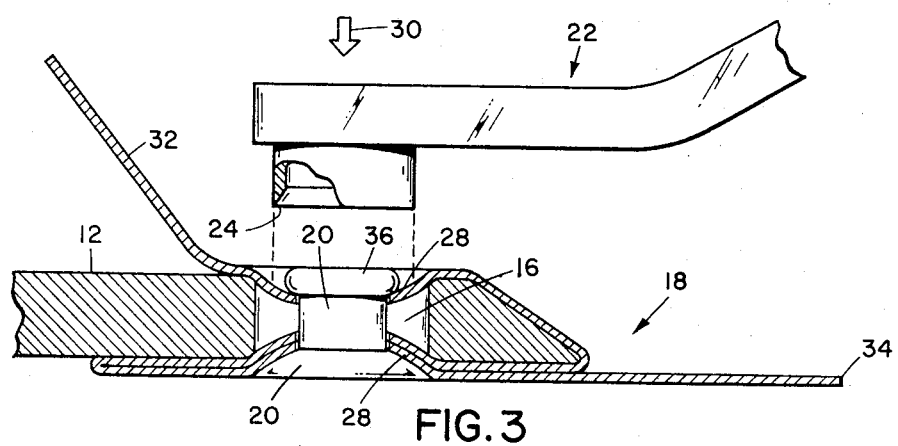
FIG. 3

MOWER BLADE

The present invention relates to an improvement in mower blades. In the type of horizontal rotating mower blades only a relatively small portion of the outer ends of the blade is utilized in the cutting operation; therefore, it is one of the objects of the present invention to provide an efficient cutting element detachably secured to the outer end of the blade bar to perform the cutting operation.

Another object of the invention is to provide an arrangement whereby the cutting element may be quickly and easily replaced.

A further object of the invention is to provide a cutting element that will protect the outer end of the blade bar from minor damage, such as stones or other foreign matter.

Still a further object of the invention is to provide means for fastening the cutter element to the blade bar which will always hold the cutting element in contact with the bar blade in resilient relationship.

While several objects of the invention have been pointed out, other objects, uses and advantages will become more apparent as the nature of the invention is more fully disclosed in the following detailed description with reference to the accompanying drawings.

FIG. 1 is a perspective view of the combination blade bar and cutter elements, one of the cutter elements being shown detached from the bar and the other being secured to the bar in cutting position.

FIG. 2 is a fragmentary cross-sectional view taken along the line 2—2 of FIG. 1 showing the blade bar and a cutter element in assembled position including the holding means in the form of a hollow rivet and a tool positioned over the rivet to upset the same for securing the cutter element to the blade bar.

FIG. 3 is a fragmentary cross-sectional view taken along the line 3—3 of FIG. 1 showing the cutter elements secured to the blade by one of the securing rivets and a tool positioned above the rivet for removing the same for replacing the cutter element.

FIG. 4 is a pictorial view of a tool which is used to form both a head on the rivet, as shown in FIG. 2, and a cutting element for removing the rivet, as shown in FIG. 3, for detaching the cutter element from the blade bar.

In referring to the drawings, like reference numerals refer to like parts throughout the several views. The numeral 10 represents the assembled blade bar and cutter elements 18. The blade bar 12 is adapted to be secured to a vertical rotatable power shaft the end of which extends through the aperture 14, after which the bar is fixed against rotation on the shaft by a suitable nut (not shown). The cutter elements 18 are secured to each end of the blade bar 12. Each of the cutter elements is shown formed from a piece of sheet steel and is provided with a cutting portion 34, a bottom portion 31, an upper portion 35 and a front portion 37. The portion 37 covers the leading edge of the blade bar, the portion 35 covers the upper surface, and the portion 31 and cutting portion 34 cover the bottom surface of the blade bar. The upper portion 35 is provided with a fin 32 along its rear edge for creating pressure in the mower housing covering the assembled blade bar and cutter elements.

The blade bar 12 is provided with a plurality of apertures 16 adjacent each end thereof for receiving the holding means for the cutting elements. The cutting elements are also provided with apertures 38 in their upper portions 35 and apertures 39 in the lower portion 31 and cutting portion 34 corresponding to those in the blade bar 12. The apertures in the blade bar are substantially larger in diameter than the apertures in the cutter elements (see FIG. 2). The areas about the apertures 38 and 39 in the cutting elements are recessed as shown at 28. This construction allows a certain amount of resiliency in the clamping of the cutter element to the blade bar whereby the cutter elements are always held to the blade bar 12 with a certain amount of resiliency which provides that the cutter elements are tightly clamped to the blade bar.

While the cutter elements are shown formed from sheet steel, they may be formed by any other suitable method including forging, extruding, etc, in which case they may not have the double layer 31 and 37 along the bottom as shown in FIG. 2, but the bottom portion 31, 37 and the cutting portion 34 may be formed in a single piece.

The cutting elements are fixed to the blade bar by suitable rivets, bolts, etc. as shown at 20. However, only rivets are shown in the illustrations and are preferred. The rivets are also preferably of the hollow type having a head 20' for engaging one of the surfaces. The rivets 20 are extended through the apertures 38 and 39 of the cutting element and the appropriate aperture 16 of the blade bar after which the unheaded end of the rivet is upset by a tool 22 by forcing the spherical head 26 of the tool into the open end of the rivet which will upset the rivet into the shape as shown at 36. This construction, as referred to before, clamps the cutting element into the larger aperture 16 in the blade bar giving it a certain amount of resiliency in its clamping effect. Also, with this construction the recesses 28 about the rivet 20 allow the outer ends of the rivet to be at least on line with the plane of the top and bottom surfaces of the cutting element which keeps any cut materials from becoming engaged with the rivet.

The fin 32 may be adjusted at any desirable angle for providing pre-determined pressure within the mower housing (not shown) for aiding in dispensing the cut materials.

When the cutter elements become worn or need to be removed for any reason, they may be removed by removing the rivets which is done with the tool 22 as shown in FIGS. 3 and 4. The tool is provided with a cutting element 24 which is of slightly larger diameter than the rivet head. By supporting one end of the rivet on an anvil, the cutting element 24 is driven down over the rivet by a force represented by the number 30, severing the top portion of the cutter element from the rivet. The bottom portion of the cutter element may also be severed in like manner. When this has been done the rivets are removed whereby the cutting element may be replaced as previously described.

With this type of construction an efficient cutting element may be maintained as the blade portion 34 of the cutting element is of a thin hardened material, and being of a thin gauge, is self-sharpening.

Another advantage of the present blade bar and cutter elements is that the leading edge of the blade bar is not normally damaged by stones and other hard materials as the blade is rotated.

While only one form of the invention is shown and described, it is not intended as a limitation as the scope of the invention is best defined in the following claims.

I claim:

1. A mower blade assembly including a blade bar and cutting elements attached thereto comprising:
   a. a rectangular rotatable blade for supporting a cutting element at each end of the bar;
   b. each cutting element being formed from a single piece of material having a bottom portion extending along the lower surface of the blade bar folded downwardly and outwardly from its rear edge in a parallel plane and adjacent the bottom portion and extending beyond the leading edge of the bar to form a cutting portion, the forward portion of the lower portion folded upwardly over the leading edge and upper surface of the blade bar and means for securing the cutting portion, bottom portion and upper portion of the cutting element to the blade bar.

2. The mower blade assembly as claimed in claim 1 wherein an aperture is formed in the blade bar adjacent the end thereof, the cutting element having a corresponding aperture formed therein of less diameter than the aperture in the blade bar, the cutting element having a recess surrounding the aperture slightly depressed in the bar aperture for a predetermined distance and a rivet means slidably through the aperture of the cutting element for securing the same to the blade bar.

3. A mower blade assembly as claimed in claim 2 wherein the rivet extends through the aperture in the cutting element and the corresponding aperture in the blade bar in which the outer ends of the rivet do not extend beyond the plane of the bottom and top surfaces of the cutting element.

4. A mower blade assembly as claimed in claim 2 wherein the portion of each cutting element extending over the upper surface of the blades is provided with an upturned fin adjacent its rear edge.

* * * * *